Aug. 11, 1936.  A. KIDD  2,050,339

METHOD OF WELDING TUBULAR CONNECTERS

Filed Aug. 1, 1934

INVENTOR
Alexander Kidd
BY
Virgil F. Davico
ATTORNEY

Patented Aug. 11, 1936

2,050,339

UNITED STATES PATENT OFFICE 2,050,339

METHOD OF WELDING TUBULAR CONNECTERS

Alexander Kidd, Allwood, N. J., assignor to M. W. Kellogg Company, New York, N. Y., a corporation of Delaware Application August 1, 1934, Serial No. 737,866

4 Claims. (Cl. 29—157)

This invention relates in general to the welding of pressure vessels and in particular to the welding of tubular connecters to pressure vessels.

When tubular connecters are welded to the walls of pressure vessels, such as the pressure vessels used in the oil refinery, chemical and power industries, it is often necessary to reinforce the vessel walls by the addition of metal thereto in the region of the joint of the connecter neck and the vessel walls. The reinforcing metal is added either in the form of a separate reinforcing pad, or pads, or as a reinforcing flange integral with the end of the tubular connecter. The separate pad, or pads, are not of themselves costly since they can be shaped in dies by a pressing operation but they are expensive to use as an extra amount of welding is necessary to unite them to the vessel walls. The cost of the extra welding is quite excessive when the reinforcing pad is made up of a plurality of separate pads. When the connecters include the reinforcing metal as an integral flange they may be united to the vessel walls without any extra welding but they are in themselves expensive due to their method of manufacture. In manufacturing the flanged connecters a forged connecter having the faces of both of its flanges perpendicular to its axis is first produced. The face of the reinforcing flange is then machined to the contour of the walls of the vessel to which it is connected. The machining operation necessary to produce the cylindrical or dished face on the flange is very expensive even when carried out with special machinery.

It is an object of this invention to provide a method for uniting tubular connecters to the walls of pressure vessels and reinforcing said walls which is carried out more easily and cheaply than the prior methods.

It is also an object of this invention to provide a method for uniting tubular connecters and reinforcing pads to the walls of pressure vessels in which a single weld that does not exceed in depth the thickness of the vessel walls is used to unite the tubular connecter and reinforcing pad to the vessel walls.

Figure 1:
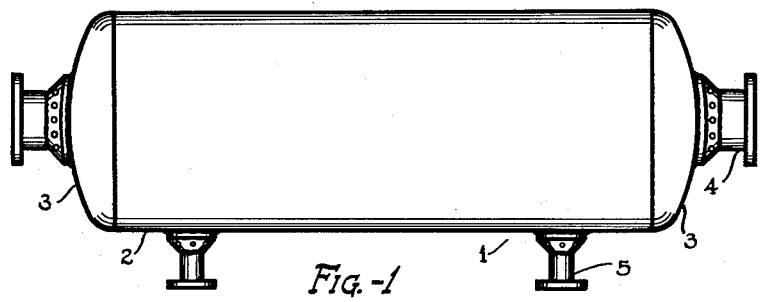
Figure 2:
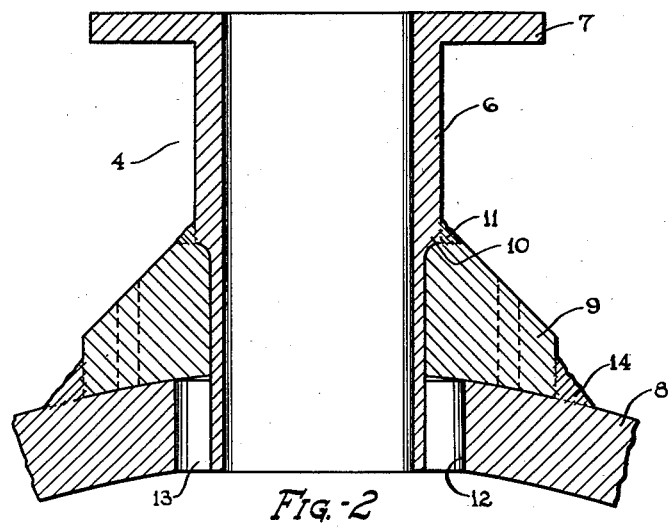
Figure 3:
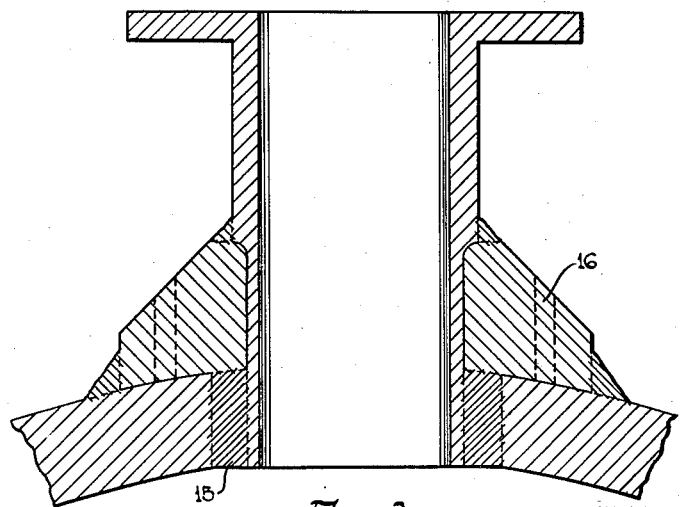

The further objects and advantages of the invention will become apparent from a consideration of the following description thereof, taken with the accompanying drawing in which, Fig. 1 is a plan view of a pressure vessel having tubular connecters united thereto in accordance with my invention, Fig. 2 is a sectional view showing a tubular connecter in the process of being united to the wall of the pressure vessel, and Fig. 3 is a view similar to that of Fig. 2 with all of the welds completed.

Vessel 1 may be any of the pressure vessels used in the petroleum refinery, chemical and power industries and for the purpose of this application is shown as made up of a cylindrical body portion 2 whose ends are closed by dished heads 3. Body portion 2 may be made up of any number of cylindrical sections, one only being shown, which in turn may be seamless or made from one or more welded plates. To dished heads 3 are united large tubular connecters 4 and to cylindrical body portion 2 are united small tubular connecters 5. Pressure vessel 1 is fabricated in any desired manner and tubular connecters 4 and 5 united to pressure vessel 1 either as the parts thereof are fabricated or after the whole of vessel 1 is assembled.

Since the same method is used in uniting tubular connecter 4 to heads 3 as is used in uniting tubular connecters 5 to body portion 2 only the uniting of tubular connecters 4 to heads 3 will be described. Tubular connecters 4 are made with a cylindrical neck 6 of uniform thickness that terminates at one end in a flange 7. Tubular connecters 4 may be made of the same material as the walls 8 of pressure vessel 1, which may be carbon steel or alloy steel, or they may be made of carbon steel lined with a thin liner of suitable corrosion resisting alloy steel. Neck 6 is reduced in thickness by machining or otherwise, for a distance substantially equal to the combined thickness of walls 8 and reinforcing pad 9 to form a thrust shoulder 10.

Reinforcing pads 9 are formed by a forging operation. In forging reinforcing pads 9 dies are used, one of which will give the widest face of pads 9 a dished surface so that they will fit properly on the walls of heads 3. In forging the pads 9 to be used with connecters 5 the one die will be such as to give the widest face a cylindrical surface. While pads 9 may be made with any desired cross section I prefer to shape them as shown so as to place as much metal as feasible adjacent the sides of the hole to be reinforced and thereby more efficiently reinforce wall 8 of vessel 1. Pads 9 are preferably made in standard sizes each of which can be used with a number of tubular connecters of different diameters, the diameters of the tubular connecters with which each size of pad 9 can be successfully used varying within a small range.

The hole through the center of pad 9 is machined to bring it to substantially the diameter of the bottom portion of tubular connecter 4 so that it will accommodate said bottom portion therein in a machine fit. If preferred, the hole in pad 9 may be somewhat smaller than the bottom portion of tubular connecter 4 and pad 9 shrunk or driven on said bottom portion. In any case, the top of pad 9 is brought into as close contact as possible with thrust shoulder 10. Pad 9 is united to tubular connecter 4 by means of circumferential weld 11. I prefer to deposit the weld metal of weld 11 from a fusible electrode by means of the electric arc but if desired weld 11 may be deposited by gas welding.

A hole 12 is cut in the walls 8 of pressure vessel 1 of such diameter that when the bottom portion of tubular connecter 4 is positioned concentrically therein a welding groove 13 is defined that is wide enough to accommodate all the weld metal required to transmit the stresses from the walls 8 of pressure vessel 1 to tubular connecter 4. Tubular connecter 4 is then placed in hole 12 concentrically so that the lower end thereof together with the sides of hole 12 and the bottom face of pad 9 form welding groove 13. Pad 9 may then be united to walls 8 by circumferential welding groove 14 which may be deposited either by electric or gas welding. Welding groove 13 is then filled by depositing therein fusing weld metal deposited either by electric or gas welding, to form weld 15. Weld 15 joins tubular connecter 4 to the walls 8 of pressure vessel 1 and reinforcing pad 9 into a unitary structure. When necessary or desirable plug welds 16 may be deposited as in the usual practice.

It is to be noted that if weld 15 is of the width mentioned above it can successfully resist the working stresses to which vessel 1 is subjected and not only connects the end of tubular connecter 4 to walls 8 but also connects the end of tubular connecter 4 to reinforcing pad 9 and walls 8 to reinforcing pad 9. It is also to be noted that while reinforcing pad 9 has all of the advantages of a similar reinforcing pad made up of a plurality of thicknesses of plate it is held in position by a single weld which does not exceed in depth the thickness of the walls 8 of pressure vessel 1. It is further to be noted that tubular connecter 6 and reinforcing pad 9 can be manufactured at only a fraction of the cost of the tubular connecters with integral reinforcing flanges and yet are just as strong and can be welded to the walls 8 of pressure vessel 1 at about the same cost.

If for any reason, i. e. wear, failure etc., it should become necessary to replace tubular connecter 4, the worn connecter 4 can be removed merely by chipping out welds 11 and 15. A new one may then be positioned in reinforcing pad 9 and then joined to reinforcing pad 9 and walls 8 of pressure vessel 1 by depositing new welds 11 and 15.

I claim:

1. The method of welding tubular connecters and reinforcing pads to the walls of pressure vessels which comprises forming a tubular connecter of the required wall thickness, reducing the diameter of one end of the connecter for a distance substantially equal to the thickness of the vessel walls and the reinforcing pad, forming the reinforcing pad with a hole therein of substantially the same size as the reduced portion of the connecter, fitting the reinforcing pad on the reduced portion of the connecter with the top of the pad abutting the unreduced portion of the connecter, forming a hole in the walls of the vessel of such size as to provide a welding groove between its sides and the end of the connecter, and uniting the end of the connecter, the reinforcing pad and the vessel walls by depositing in said welding groove fusing weld metal.

2. The method of welding tubular connecters and reinforcing pads to the walls of pressure vessels which comprises forming a tubular connecter of the required wall thickness, reducing the diameter of one end of the connecter for a distance substantially equal to the thickness of the vessel walls and the reinforcing pad, forming the reinforcing pad with a hole therein of substantially the same size as the reduced end of the connecter, said reinforcing pad being generally triangular in cross section and its maximum thickness exceeding that of the vessel walls, fitting the reinforcing pad on the reduced end of the connecter with the top of the pad abutting the unreduced portion of the connecter, forming a hole in the walls of the vessel of such a size as to provide a welding groove between its sides and the end of the connecter, and uniting the end of the connecter, the reinforcing pad and the vessel walls by depositing fusing weld metal in said welding groove.

3. The method of welding tubular connecters and reinforcing pads to the walls of pressure vessels which comprises forming a tubular connecter of the required wall thickness, forming a reinforcing pad with a hole centrally therethrough, reducing the diameter of one end of the connecter for a distance substantially equal to the combined thickness of the vessel walls and the reinforcing pad, the hole in the reinforcing pad being of substantially the same size as the outside of the reduced portion of the connecter, fitting the pad on the connecter with its top against the unreduced portion of the connecter, uniting the top of the pad to the unreduced portion of the connecter by depositing fusing weld metal between them, forming a hole in the vessel wall of a diameter greater than the outside diameter of the reduced portion of the connecter by an amount substantially equal to the width of weld metal required to successfully transmit the stress from the vessel walls to the reinforcing pad and connecter, placing the connecter in the hole concentric therewith and with the bottom of the reinforcing pad in contact with the vessel walls to thereby define a welding groove between the end of the connecter, the sides of the hole in the vessel walls and the bottom of the reinforcing pad, uniting the outside edge of the reinforcing pad to the vessel walls by depositing fusing weld metal between them, and uniting the end of the connecter, the reinforcing pad and the vessel walls by depositing fusing weld metal in the groove defined between them.

4. The method of welding tubular connecters and reinforcing pads to the walls of pressure vessels which comprises forming a tubular connecter of the required wall thickness, reducing the diameter of one end of the connecter for a distance substantially equal to the combined thickness of the vessel walls and the reinforcing pad, forging the reinforcing pad in dies one of which is shaped as the vessel walls in the region to which the connecter is to be united, said pad as forged having a hole therein of substantially the same size as the reduced portion of the connecter and having its bottom face shaped to fit on the vessel walls, said pad also being generally triangular in cross section and being materially thicker than the vessel walls, fitting the reinforcing pad on the connecter with its top against the unreduced portion thereof, uniting the top of the pad to the unreduced portion of the connecter by depositing between them fusing weld metal, forming a hole in the walls of the vessel larger than the reduced end of the connecter, placing the connecter concentrically in the hole with the bottom of the reinforcing pad on the walls of the vessel, uniting the reinforcing pad to the walls of the vessel by depositing fusing weld metal between the outer edge of the pad and the walls of the vessel, the hole in the wall of the vessel being of such size that a welding groove of a width sufficient to accommodate the weld metal required to withstand the stresses transmitted from the walls of the vessel to the connecter and reinforcing pad is defined between the end of the connecter and the walls of the hole, and uniting the walls of the vessel, the reinforcing pad and the end of the connecter by filling in said welding groove with fusing weld metal.

ALEXANDER KIDD.